March 20, 1956
J. A. DE JULIO
2,739,211
ELECTRICAL PRESSURE TRANSDUCER
Filed March 26, 1953
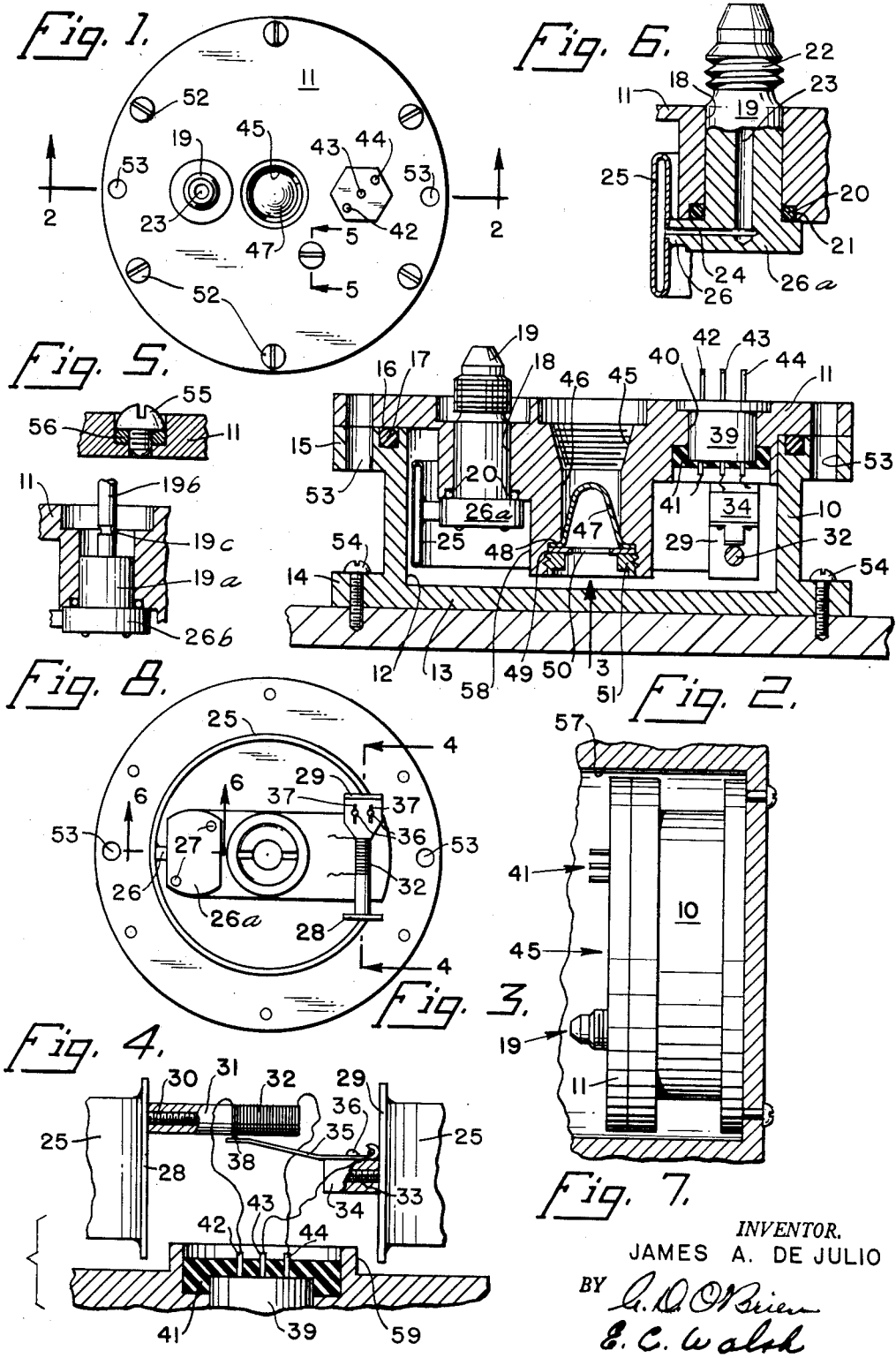
INVENTOR.
JAMES A. DE JULIO
BY *G. D. O'Brien*
*E. C. Walsh*
ATTORNEYS

2,739,211

ELECTRICAL PRESSURE TRANSDUCER

James A. DeJulio, Sierra Madre, Calif.

Application March 26, 1953, Serial No. 344,913

2 Claims. (Cl. 201—48)

(Granted under Title 35, U. S. Code (1952), sec. 266)

The invention described herein may be manufactured and used by or for the Government of the United States of America for governmental purposes without the payment of any royalties thereon or therefor.

This invention relates to pressure measuring instruments and more particularly to improvements in potentiometer type pressure transducers.

Various types of pressure transducers have been employed in the prior art, these including capacitance, inductance and potentiometer types, the latter being preferred for some installations due to their relative simplicity in that accessories such as amplifiers, oscillators, etc., are not required. Transducers of this type, while advantageous in some respects, have, however, required cumbersome installations which have rendered their maintenance difficult.

One of the objects of this invention is to provide a potentiometer type pressure transducer which may be more readily installed and maintained.

Another object is to provide a transducer of the foregoing type in which all operative parts and the external detachable electrical and pressure connections are carried by a casing closure member.

Another object is to provide a transducer in which all external electrical and pressure connections are disposed adjacent one face of same.

Another object is to provide a compact transducer which requires minimized special requirements for its installation.

Another object is to provide a transducer for measuring the pressure of a single pressure source or the differential pressure of two sources.

Another object is to provide a transducer which may withstand high acceleration forces without damage to its operative parts.

Further objects are to provide a transducer having a simplified construction and which may be economically manufactured.

Still further objects and many of the attendant advantages of this invention will be readily appreciated as the same becomes better understood by reference to the following detailed description when considered in connection with the accompanying drawings wherein:

Fig. 1 is a top plan of a preferred embodiment of the invention;

Fig. 2 is a section taken on line 2—2, Fig. 1;

Fig. 3 is a bottom plan of interior parts as viewed in the direction of arrow 3, Fig. 2;

Fig. 4 is an enlarged section taken on line 4—4, Fig. 3;

Fig. 5 is an enlarged section taken on line 5—5, Fig. 1;

Fig. 6 is an enlarged section taken on line 6—6, Fig. 3;

Fig. 7 illustrates an installation of the invention in minimized space; and

Fig. 8 is a section, similar to Fig. 6, of an alternative part which may be employed.

Referring in detail to the drawings, the subject of the invention comprises, in general, two principal units; a casing 10, and a closure 11 for same.

Casing 10 is provided with a bore 12, one end of which is closed by an integral wall 13, the casing having outwardly projecting annular flanges 14, 15 adjacent opposite ends, and an annular groove 16 in one end face thereof which receives an O ring 17 forming a seal between the casing and the closure.

As best shown in Fig. 6, closure 11 is provided with a bore 18 which receives a conduit member 19 sealed within the bore by an O ring 20 disposed in a counterbore 21. Conduit member 19 is provided with threads 22 which threadedly engage a conventional coupling nut (not shown) which detachably connects a tube (not shown) extending from a source of pressure, to the conduit member. An aperture 23 in the conduit member communicates the pressure source with a transverse aperture 24 which communicates with the inside of a Bourdon tube 25, preferably constructed of stainless steel, the latter being affixed, as by hard solder, to an integral lateral projection 26 on member 19. This forms the sole support of the Bourdon tube, and, as best shown in Fig. 3, this support is disposed substantially at the center of the arcuate extent of the Bourdon tube. Conduit member 19 is provided with a flat base 26a which abuts a corresponding inner face of the closure and is rigidly secured thereto by screws 27 which extend through the base and threadedly engage the closure.

Plates 28, 29 are hard soldered to the ends of the Bourdon tube and form closures for same. As best shown in Fig. 4, one end of a threaded stud 30 is affixed to plate 28 and a tube 31 of electrical insulating material threadedly engages the stud, tube 31 having thereon a helical resistance winding 32. Plate 29 is provided with a similar stud 33 which threadedly engages a block 34 of electrical insulating material. A contact finger 35 is secured to a face of the block by screws 36, which extend through enlarged elongated slots 37 in the finger and threadedly engage the block. As will be apparent, this renders contact end 38 of the finger adjustable axially and angularly relative to winding 32 for calibration of the instrument.

A conventional electric plug device 39 is disposed within a bore 40 in closure 11 and is sealed by any suitable plastic or other material 41. A plurality of contact prongs 42, 43, 44 project from this device which are adapted to be received in a conventional multiple contact electric jack. As best shown in Fig. 4, the ends of coil 32 are electrically connected to the inner ends of prongs 42, 44 and contact finger 35 is electrically connected to the inner end of prong 43. Voltage is impressed across the ends of the coil and finger 35 forms a pick-off for a differential voltage, this being conventional and well understood in the art.

When the instrument is constructed as a differential pressure transducer a threaded opening 45 is provided in the closure to which a conduit may be connected to a second source of pressure. This opening communicates with a bore 46 in which is disposed a cup shaped resilient diaphragm 47 of rubber or the like which is provided with an annular flange 48 retained in a counterbore 49 by a washer 50 and an annular nut 51 which threadedly engages the counterbore. The inside of the casing is filled with a suitable liquid, such as silicone oil, and as will be apparent, when pressure is applied to the outer surface of the diaphragm the latter transmits this pressure to the liquid and to the outer surface of the Bourdon tube.

The closure is secured to flange 15 by a plurality of screws 52 which extend through the rim of the closure and threadedly engage the flange. Additional apertures 53, extending through the closure rim and flange 15, may be employed if desired, through which mounting screws 54 may be bodily inserted.

As best shown in Fig. 5, closure 11 is provided with a plug 55, in the form of a headed screw, which is driven into a threaded aperture in the closure against a sealing O ring 56. This plug may be removed to fill the casing with liquid when the instrument is employed as a differential pressure transducer. When the instrument is not filled with liquid and it is desired to maintain ambient pressure within the casing at a first altitude, when the instrument is moved to a second altitude, the screw is loosened at the first altitude to equalize ambient and casing pressure, after which it is tightened. When so used, aperture 45 will be plugged, or alternatively, an instrument will be employed which is not provided with aperture 45, diaphragm 47, etc.

If it be desired to utilize the device as an absolute pressure gage, the Bourdon tube may be evacuated by use of a conduit member 19a, as shown in Fig. 8, which is provided with a tube 19b which may be connected to a suitable vacuum pump. After the Bourdon tube is evacuated, tube 19b is provided with a sealing crimp 19c. Tube 19b is then cut off flush with the outer face of closure 11 and solder applied to the end of the tube. Alternatively, boss 58 may be machined to receive a conduit member of the type just described and the inside of the casing similarly evacuated, rather than the Bourdon tube.

Plates 28, 29, previously referred to, also serve as abutments to limit movement of the Bourdon tube when the device is subjected to excessive accelerations or overload pressures. Referring to Fig. 4, it will be apparent that these plates may abut projection 59 when either of them move in a direction toward the projection. If the movement of the ends of the Bourdon tube is in a direction perpendicular to the plane of the tube, the ends of these plates may abut the inside face of the closure or the inside face of wall 13 of casing 10. If the Bourdon tube tends to open excessively it will abut the surface of bore 12.

Fig. 7 illustrates an installation of the instrument in a cup shaped cavity 57 slightly larger in diameter than the instrument. As will be apparent, connections 19, 41, 45 are all readily accessible and all operative parts of the instrument may be rendered accessible by removal of the closure from the casing.

Obviously many modifications and variations of the present invention are possible in the light of the above teachings. It is therefore to be understood that within the scope of the appended claims the invention may be practiced otherwise than as specifically described.

What is claimed is:

1. A pressure sensing instrument comprising a cupped housing, a closure sealing against and over the open end of the cupped housing, said closure having an inwardly directed projection, a conduit member extending through the closure and having a base in sealing engagement with the closure, a Bourdon tube located inside of the housing and having a tubular projection communicating the interior of the Bourdon tube with the conduit member and constituting the sole support of the Bourdon tube, plates closing the ends of the Bourdon tube, portions of the plates confronting the projection for limiting the movement of the Bourdon tube in one plane, an electrical plug embodied in the closure and containing conductors accessible adjacently to the projection, an electrical winding mounted on one of the plates in proximity to the projection, a contact finger mounted on the other plate, also in proximity to the projection, and connections from the ends of the winding and from the contact finger to requisite ones of the conductors.

2. A pressure sensing instrument comprising a cupped housing, a closure sealed against and over the open end of the cupped housing, said closure having an inwardly directed projection, a conduit member extending through the closure and having a base in sealing engagement with the inside of the closure, a Bourdon tube, annular in form, located inside of the housing and contiguous to the internal annular wall of the housing, said Bourdon tube having its ends directed toward but spaced from each other, a tubular projection connected to the Bourdon tube substantially medially of its ends, communicating the interior of the Bourdon tube with the conduit member and constituting the sole support of the Bourdon tube, plates closing the ends of the Bourdon tube, portions of the end plates confronting the projection for limiting the movement of the Bourdon tube in one plane, each of the plates having a mount, an electrical plug embodied in the closure at the projection and containing conductors accessible inside of the housing, an electrical winding on one of the mounts, a contact finger on the other mount, and connections from the ends of the winding and from the contact finger to requisite ones of the conductors.

References Cited in the file of this patent

UNITED STATES PATENTS 2,622,177    Klose               Dec. 16, 1952